United States Patent Office 3,087,932
Patented Apr. 30, 1963

3,087,932
PROCESS FOR PREPARING 2,5-BIS(HYDROCAR-BONDITHIO)-1,3,4-THIADIAZOLE
Randel Q. Little, Jr., Munster, Ind., assignor to Standard Oil Company, Chicago, Ill., a corporation of Indiana
No Drawing. Filed July 9, 1959, Ser. No. 825,896
15 Claims. (Cl. 260—302)

This invention relates to the preparation of 2,5-bis(hydrocarbondithio)-1,3,4-thiadiazole. More particularly this invention relates to the preparation of 2,5-bis(hydrocarbondithio)-1,3,4-thiadiazole from 2,5-dimercapto-1,3,4-thiadiazole or its alkali metal salts and an alkyl mercaptan.

2,5-bis(R-dithio)-1,3,4-thiadiazoles, wherein R is aliphatic or aromatic, including acyclic, alicyclic, aralkyl, aryl and alkaryl, are effective corrosion inhibitors for silver, silver alloys and similar metals. Their properties are well known in the art and their particular utility is more fully described by E. N. Roberts in U.S. 2,719,125 and E. K. Fields et al. in U.S. 2,719,126. The normal process for preparing 2,5-bis(R-dithio)-1,3,4-thiadiazole is by chlorinating a 2,5-dimercapto-1,3,4-thiadiazole to form a bis sulfenyl chloride and reacting the resulting bis sulfenyl chloride with an R-mercaptan. The process is carried out in a two step procedure forming the bis sulfenyl chloride first by the chlorinating step and then reacting the bis sulfenyl chloride with the R-mercaptan in a second and separate step. However the conditions of reaction require that the reactants be kept anhydrous throughout the reaction. Also, the first step chlorination reaction requires the handling of chlorine gas and disposal of hydrogen chloride formed in the reaction, creating hazards for personnel attending the reaction. In addition, the dimercapto-thiadiazole starting material is normally made as its sodium salt and then reacted with mineral acid to obtain the dimercapto-thiadiazole. The sodium salt itself cannot be used as a starting material in the chlorination step. Therefore, in accordance with the prior process for making 2,5-bis(R-dithio)-1,3,4-thiadiazole a two step operation has been necessary i.e., chlorination and subsequent reaction with a mercaptan and in many instances a three step operation was required in that the 2,5-dimercapto-1,3,4-thiadiazole had previously been prepared from its sodium salt.

I have discovered that 2,5-bis(R-dithio)-1,3,4-thiadiazole may be prepared in excellent yields from either 2,5-dimercapto-1,3,4-thiadiazole or its alkali metal or ammonium salts in a one step process. In accordance with my process, hydrogen peroxide is charged slowly to 2,5-dimercapto-1,3,4-thiadiazole or its alkali metal or ammonium salt in admixture with a mercaptan in the presence of a solvent at a temperature in the range from about 0° C. to about 100° C. and preferably from about 15° C. to about 85° C. If the sodium salt of 2,5-dimercapto-1,3,4-thiadiazole, i.e. 2,5-dimercapto-1,3,4-thiadiazole-disodium, is used, sufficient amounts of an inorganic acid such as, for example, sulfuric acid, nitric acid, hydrochloric acid, phosphoric acid, etc., are added along with the hydrogen peroxide to react with substantially all of the sodium of the salt. The hydrogen peroxide and inorganic acid, if inorganic acid is used, are added slowly and it is preferred to add the hydrogen peroxide over a period of from about 3 to about 10 hours or more, particularly in a scaled-up commercial operation. The reaction is almost immediate upon addition of the hydrogen peroxide within the preferred temperature range but may proceed more slowly at temperature below about 55° C. After addition of the hydrogen peroxide, it may be advantageous to maintain the resulting reaction mixture at a temperature in the above range and preferably from about 60° C. to about 100° C. for a short period of time to assure good yield. The 2,5-bis(R-dithio)-1,3,4-thiadiazole is separated from the reaction mixture as an organic layer. The organic layer is then washed with water and stripped of solvent to produce substantially pure 2,5-bis(R-dithio)-1,3,4-thiadiazole.

The present invention is advantageously used to produce 2,5-bis(R-dithio)-1,3,4-thiadiazole in a one step operation. Another advantage of this process is elimination of the necessity of handling chlorine and the hazards of using chlorine. Further, the present process need not be maintained under anhydrous conditions throughout the reaction; in fact, water is an acceptable solvent for the reaction. Also, the process may be employed to convert the sodium or other alkali metal salt of 2,5-dimercapto-1,3,4-thiadiazole directly to 2,5-bis(R-dithio)-1,3,4-thiadiazole without the additional step of removing the sodium or other alkali metal from the salt with sulfuric acid.

The reaction mixture of this process is in three phases; i.e. organic phase, aqueous phase and solid phase. The alkyl mercaptan is the active ingredient of the organic phase which phase is above the aqueous phase and separated therefrom by a distinct phase boundary. The aqueous phase includes the solvent and an active ingredient of the aqueous phase is the hydrogen peroxide. The solid phase includes the 2,5-dimercapto-1,3,4-thiadiazole compound as a solid material. The solid phase is within the aqueous phase and substantially near the bottom thereof. During the reaction the three phase system is mixed such as with a stirring propeller, at the reaction temperature and the 2,5-dimercapto-1,3,4-thiadiazole compound of the solid phase reacts with the alkyl mercaptan of the organic phase with hydrogen peroxide of the aqueous phase as the promoter. It is not understood why the reaction proceeds in such a manner so as to react the active ingredients of the separate phases rather than condense the active ingredients within each separate phase by reaction with each other within each phase, and particularly, it is not understood why the action proceeds without appreciable condensation of alkyl mercaptan within the organic phase alone. The reaction apparently proceeds across phase boundaries. After the reaction the desired reaction product is separated as the organic layer. Because the exact mechanics of the reaction are not known, I do not intend to be held to any theories included herein.

The mercaptans which may be used in the reaction with the 2,5-dimercapto-1,3,4-thiadiazole or salt thereof are the mercaptans having the general formula RSH (referred to herein as R-mercaptans) wherein R can be aliphatic or aromatic hydrocarbon groups including acyclic, alicyclic, aralkyl, aryl and alkaryl radicals or mixtures of such radicals. The hydrocarbon groups can contain from 1 to about 30 carbon atoms and preferably are alkyl groups containing from about 4 to about 16 carbon atoms. Examples of suitable mercaptans are ethyl mercaptan, propyl mercaptan, butyl mercaptan, hexyl mercaptan, octyl mercaptan, nonyl mercaptan, dodecyl mercaptan, tridecyl mercaptan, hexadecyl mercaptan, octadecyl mercaptan, cyclohexyl mercaptan, phenyl mercaptan, tolyl mercaptan, benzyl mercaptan, naphthyl mercaptan, styryl mercaptan, etc., and mixtures thereof. The hydrocarbon group of the mercaptan may also contain such substituents as, for example, cyano, halogen, hydroxy, nitro, carboxy, carbonyl, etc. substituents. The R of the R-mercaptan as set out hereinabove will be the same as the R of the 2,5-bis(R-dithio)-1,3,4-thiadiazole product of the present process.

The theoretical amounts of reactants in the above reaction are two moles of hydrogen peroxide and two moles of mercaptan for each mole of 2,5-dimercapto-1,3,4-thiadiazole or salt thereof used. Although it is fully intended that molar amounts in from the range of from about 1.75 to about 3 moles and advantageously 1.9 to 2.2 moles of hydrogen peroxide and from about 1.75 to about 2.25 moles of mercaptan per mole of 2,5-dimercapto-1,3,4-thiadiazole or salt thereof may be used, it is preferred that about theoretical amounts of the mercaptan, i.e. from about 1.9 to about 2.1 moles per mole of 2,5-dimercapto-1,3,4-thiadiazole or salt thereof, be used. With less than theoretical amounts of hydrogen peroxide the reaction may not go to completion and the product may have to be filtered to remove unreacted dimercapto-thiadiazole and then stripped to remove the incompletely separated solvent and mercaptan. Therefore, I prefer to use a slight excess of the theoretical amount, e.g. 10% excess of theoretical amount, of hydrogen peroxide in the reaction mixture.

The solvent may be any known chemically inert solvent for hydrogen peroxide. The solvent may be refluxed during the reaction and may thereby assist in controlling the reaction temperature. Therefore, it is advantageous to use a solvent which will reflux within the temperature range of the reaction. Such solvents as water, methanol, acetone, phenol, isopropanol, ethanol, pentanol, ethylene glycol, glycerol, erythritol, and the like, or mixtures thereof are suitable for use in this invention. Other such solvents are well known to the art. It is preferred to use either water or a mixture of about equal parts of water and ethanol as a reflux solvent and with the preferred solvent, the reaction proceeds at a temperature within the preferred range under reflux conditions. I prefer to use from about 0.2 to about 1.0 volume of solvent per total volume of reactants.

Upon completion of the reaction, if the inorganic salts do not separate more solvent, e.g. water, should be added at that time until the salts are dissolved and separated from the organic layer.

The inorganic acids usable in this invention are those inorganic acids which will readily react with sodium or other alkali metal substituents to form a water soluble salt. Such acids include sulfuric acid, phosphoric acid, sulfurous acid, phosphorous acid, hydrochloric acid, hydrofluoric acid, etc. Sulfuric acid is preferred because of its general availability.

I have found that by my preferred procedure using an excess of hydrogen peroxide, a high purity 2,5-bis(R-dithio)-1,3,4-thiadiazole may be produced. However, in the event it is found undesirable to use an excess of hydrogen peroxide I may purify the product by filtering to remove unreacted dimercapto-thiadiazole and stripping the washed product at about 80°–150° C. and 0.5 mm. Hg to remove the last traces of solvent and mercaptan.

In a scaled-up commercial plant operation, it is advantageous to form an aqueous solution of a sodium salt of 2,5-dimercapto-1,3,4-thiadiazole in a reaction vessel, add the inorganic acid to remove sodium from the salt and then react the mercaptan with the resulting 2,5-dimercapto-1,3,4-thiadiazole in the presence of hydrogen peroxide. The procedure which follows may advantageously be used: (A kettle or other reaction vessel, fitted with a stirrer, condenser, and exhaust vent, is charged with water, hydrazine and sodium hydroxide. The hydrazine and sodium hydroxide should be added in approximately equimolar amounts to form the mono-sodium salt, or about two moles of sodium hydroxide per mole of hydrazine may be used to form the di-sodium salt. The ingredients of the reaction vessel are blanketed with nitrogen, the condenser and stirrer are activated and the exhaust vent is opened. The reaction vessel jacket temperature is brought within the range of from about 80° to about 110° F. and preferably within the range of from about 90° to about 95° F. About two moles or more of carbon disulfide per mole of hydrazine are then charged at a slow rate so as to keep the temperature of the reaction below 110° F. A ten percent excess or more carbon disulfide should be used. It may be necessary to cool the reaction. When about half of the carbon disulfide is added hydrogen sulfide gas will be detectable at the vent. The preferred reaction temperature is in the range of from about 100° to 110° F.; however, the reaction should not be allowed to proceed very much above about 110° F. and, therefore, it is advantageous to assure this by trying to keep the temperature in the range of 80 to 100° F. particularly where cooling means are inadequate to maintain the reaction in the narrow 100° to 110° F. range. After addition of the carbon disulfide, the reaction mixture is then warmed slowly to a temperature above about 150° F. and an equimolar amount of inorganic acid based on sodium hydroxide is added at a rate to keep the temperature between about 150° and 160° F. Cooling may be necessary. Then about two moles of mercaptan, pure as octyl mercaptan, for example, per mole of hydrazine are added to the reaction mixture. I have found that based on moles of hydrazine only about 95 mole percent of mercaptan reacts with the reaction mixture which contains 2,5-dimercapto-1,3,4-thiadiazole formed from the reagents added above. Therefore, in order to conserve mercaptan, I prefer to add five percent less than theoretical amounts of mercaptan. Next, at least 2 moles and advantageously 10% or more excess of hydrogen peroxide are added based on hydrazine over a period of from 3 to about 10 or more hours. The temperature of the reaction mixture is maintained advantageously between about 160° and 180° F. and should not exceed about 210° F., except that if caking occurs the temperature should be raised slowly above 210° F. to break the caking and then cooled back to reaction temperature. After addition of hydrogen peroxide, the reaction mixture is heated to about 200° F. and held for a short period to assure good yield. Mixing is then stopped and the layers are allowed to separate for about ½ hour. The water layer is drawn off and the organic layer may be washed with solvent, blown with nitrogen, stripped, and filtered to remove impurities. The solvents used may be any solvent for inorganic materials which does not appreciably dissolve the organic layer. Such solvents are well known. When water is used as the solvent, it is advantageous to added thereto soluble inorganic salt to inhibit emulsions and to increase the solubility of the organic layer in the water.

The following preparations and examples are included herein as further description and as illustrations of this invention. Preparations I through III include the preparations of (I) a disodium salt of the dimercapto-thiadiazole in aqueous solution which may be used directly in the present process and may be formed in situ in the reactor to be used in the present process; (II) dry mercapto-thiadiazole such as is used in the prior art preparation of the bis (hydrocarbon dithio)-thiadiazole by chlorination, discussed above; and (III) the prior art preparation of bis (hydrocarbondithio)-thiadiazole by chlorination. Preparation IV includes examples and illustrations of the process of my invention.

PREPARATION I

*Preparation of Aqueous Solution of 2,5-Dimercapto-1,3,4 Thiadiazole-Disodium Salt*

456 grams (6 moles) of carbon disulfide were added slowly to a solution of 170 grams (3 moles) of 84% hydrazine hydrate and 240 grams (6 moles) of sodium hydroxide in 900 ml. water at a temperature of from 35° to 40° C. The mixture was then heated to 45° C., held at 45° C. for 1 hour, heated to from 90° to 100° C. held at from 90° to 100° C. for 1 hour, and then cooled to 50° C. The resulting product was an aqueous solution of 2,5-dimercapto - 1,3,4 - thiadiazole-disodium salt. This may be used directly for the preparation in Example III, below.

PREPARATION II

*Preparation of Dry 2,5-Dimercapto-1,3,4-Thiadiazole*

600 grams (3 moles) of 50% sulfuric acid were added to the aqueous solution of 2,5-dimercapto-1,3,4-thiadiazole-disodium salt and a precipitate of 2,5-dimercapto-1,3,4-thiadiazole was formed in the reaction mixture. The reaction mixture was filtered to remove the precipitated 2,5-dimercapto-1,3,4-thiadiazole. The 2,5-dimercapto-1,3,4-thiadiazole was washed with water and dried. Yield of 2,5-dimercapto-1,3,4-thiadiazole was 74%.

PREPARATION III

*Preparation of 2,5-Bis(R-Dithio)-1,3,4-Thiadiazole by Chlorination*

To illustrate the preparation of 2,5-bis(alkyldithio)-1,3,4-thiadiazole by the prior art chlorination method, 405 grams (2.61 moles) of the dry 2,5-dimercapto-1,3,4-thiadiazole prepared above were mixed with 2500 ml. of carbon tetrachloride and the mixture was treated with 408 grams (5.75 moles) of chlorine gas at 0° to 15° C. to form 1,3,4 - thiadiazole - 2,5 - bis-sulfenyl chloride. 765 grams (5.22 moles) of t-octyl mercaptan were added dropwise at 0° to 15° C. The reaction mixture was then blown with nitrogen for two hours to remove liberated hydrogen chloride gas. During the blowing with nitrogen, the reaction mixture was allowed to warm to 25° C. The reaction mixture was then washed twice with water and stripped of solvents and dried by blowing with nitrogen for 1 hour at 110° C. The resulting product was filtered and a yield of 950 grams of 2,5-bis(t-octyldithio)-1,3,4-thiadiazole was obtained. The yield was 83% based on dry 2,5-dimercapto-1,3,4-thiadiazole and the over-all yield for the preparation of dry 2,5-dimercapto-1,3,4-thiadiazole and reaction to form 2,5-bis(t-octyldithio)-1,3,4-thiadiazole was 62%. The product was analyzed for sulfur content, nitrogen content, acidity, and refractive index and the results of the analysis are reported in Table I, below.

PREPARATION IV

*Preparation of 2,5-Bis(R-Dithio)-1,3,4-Thiadiazole by Hydrogen Peroxide Oxidation*

In contrast to the above preparation by chlorination, the present invention provides a method for preparing 2,5-bis(R-dithio)-1,3,4-thiadiazole from 2,5-dimercapto-1,3,4-thiadiazole or a salt thereof and an alkyl mercaptan by using hydrogen peroxide as an oxidizing agent. In this method, the sodium salt of 2,5-dimercapto-1,3,4-thiadiazole as prepared above or other salt may be used directly to prepare the 2,5-bis(R-dithio)-1,3,4-thiadiazole or the sodium salt or other salt may be converted by addition of an acid and the resulting aqueous solution of 2,5-dimercapto-1,3,4-thiadiazole may be used directly since in the hydrogen peroxide oxidation there is no necessity for keeping the reaction anhydrous. The following examples are illustrative of the present invention:

EXAMPLE I

An aqueous solution of 2,5-dimercapto-1,3,4-thiadiazole-disodium salt was prepared using the reactants in amounts as set out in Preparation I, above. 600 grams (3 moles) of 50% sulfuric acid were added to the aqueous solution. Then 890 grams (6 moles) of t-octyl mercaptan and 600 ml. of ethyl alcohol were added. To the resulting mixture, 748 grams (6.6 moles) of 30% hydrogen peroxide were added at a rate to keep the temperature between about 40° C. and about 50° C. The mixture was then heated to a temperature in the range of 70° to 80° C. and held in that range for one hour while stirring. The aqueous layer was separated from the organic layer and the organic layer was washed twice with about 500 ml. of hot water, dried by blowing with nitrogen at 100 to 110° C. for 1 hour and filtered to remove any solids such as unreacted 2,5-dimercapto-1,3,4-thiadiazole. The analysis of the resulting 2,5-bis(t-octyldithio)-1,3,4-thiadiazole is shown in the table below. The yield was 1125 grams or 85%.

EXAMPLE II 230 g. (two moles) of 30% hydrogen peroxide were added dropwise to a mixture of 150 g. (one mole) of 2,5-dimercapto-1,3,4-thiadiazole and 292 g. (two moles) of t-octyl mercaptan in 250 ml. water and 250 ml. ethyl alcohol at a temperature range between 20° C. and 50° C. The resulting mixture was then slowly heated to reflux conditions (70° C. to 85° C.) and maintained at reflux conditions while stirring for between one hour and two hours. The mixture was then cooled and diluted with 500 ml. water and filtered to remove unreacted 2,5-dimercapto-1,3,4-thiadiazole. The organic layer was separated from the aqueous layer and stripped at a temperature of 80–100° C. and 0.5 mm. of Hg to remove traces of solvent. The residue product was crude 2,5-bis(octyldithio)-1,3,4-thiadiazole, analysis of which is shown in the table below. The yield was 330 g. or 74.8%.

EXAMPLE III 876 g. (six moles) t-octyl mercaptan and 600–900 ml. ethyl alcohol were admixed with an aqueous solution of 2,5-dimercapto-1,3,4-thiadiazole-disodium salt prepared using the amounts of reactants set out in Preparation I.

A solution of 690 g. (6 moles) of 30% hydrogen peroxide and 600 g. (3 moles) of 50% sulfuric acid was added dropwise to the mixture at a temperature ranging between 20° C. and 50° C. The mixture was then warmed slowly to reflux conditions and maintained under reflux conditions (70° to 85° C.) for between 30 minutes and one hour while stirring. Sufficient water (less than about 100 ml.) was added to dissolve any of the sodium sulfate produced in the reaction that may have separated and the organic layer was withdrawn from the inorganic layer. The organic layer was washed with hot water, stripped of the last traces of solvent by blowing with nitrogen gas at 180 to 200° F. and filtered. The resulting crude product was 2,5-bis(t-octyldithio)-1,3,4-thiadiazole, analysis reported in the table below. The yield was 1125 g. or 85%.

EXAMPLE IV 75 grams of 2,5-dimercapto-1,3,4-thiadiazole, 250 ml. of water and 90 grams of n-butyl mercaptan were mixed and 120 grams (108 ml.) of 30% hydrogen peroxide were added at a temperature of about 50° C. and after addition of hydrogen peroxide, the reactants were maintained at about 50° C. for about 1 hour while stirring. The water layer was removed and the organic layer washed with water, then dried over anhydrous magnesium sulfate, and stripped at 100° C. and 1 mm. pressure. The residue product was crude 2,5-bis(butyldithio)-1,3,4-thiadiazole, analysis of which is shown in the table below.

EXAMPLE V

A scaled-up plant run was made to test the process of this invention in plant operation. Accordingly, 43 gallons of water, 267 pounds of 54% hydrazine and 360 pounds of 50% sodium hydroxide were charged to a kettle fitted with a water cooled reflux condenser, a vent, exhaust and a stirrer. The contents of the kettle were blanketed with two pounds of nitrogen; the stirrer and vent exhaust were started and a flow of cold water was started through the condenser. The kettle jacket temperature was brought to 90°–95° F. and 755 pounds of carbon disulfide were charged under the liquid surface at a rate to maintain the temperature below 110° F. The mixture was then warmed slowly to 150° F. over a period of about 3 hours. 222 pounds of 97% sulfuric acid were added at a rate to keep the temperature between 150° and 160° F. 1250 pounds of t-octyl mercaptan were added to the kettle and then 960 pounds of 35% hydrogen peroxide were charged at a rate to keep the temperature between 160° and 180° F. The reactants were then heated to about 200° F. and held for about 1 hour. The stirrer was stopped and the layers were allowed to separate for about ½ hour while the temperature decreased from 200° F. to about 180° F. The water layer was drawn off and discarded and 100 gallons of water and 120 pounds of sodium sulfate were added to the kettle to wash the organic layer. The mixture was stirred and heated at 180 to 200° F. for 15 minutes and then the layers were again allowed to separate for about ½ hour. The water layer was drawn off and the organic layer was blown with 10 pounds nitrogen and then heated to 300° F. and distilled for about 1 hour. The organic layer was then put under vacuum at 300° F. for about 1 hour. The organic layer was cooled to a temperature in the 180 to 200° F. range and filtered through Celite. Yield was 1660 pounds of crude 2,5-bis(t-octyldithio)-1,3,4-thiadiazole which included 4% unreacted mercaptan as the contaminant.

EXAMPLE VI

In another plant run, the run of Example V was repeated except that 237 pounds of flake sodium hydroxide were used instead of the 360 pounds of 50% sodium hydroxide and 292 pounds of 97% sulfuric acid were used instead of 222 pounds. The change in amount and type of sodium hydroxide resulted in having about 1.3 moles of sodium hydroxide per mole of hydrazine instead of about equimolar amounts as in Example V. The increase in amount of sulfuric acid corresponded to the additional sodium hydroxide. This run yielded 1681 pounds of crude 2,5-bis(t-octyldithio)-1,3,4-thiadiazole which included about 3% unreacted mercaptan as the contaminant.

The percent yields reported herein were computed as moles of product multiplied by 100 and divided by moles of hydrazine hydrate used in the preparation of the 2,5-dimercapto-1,3,4-thiadiazole or salt thereof. All other percents recited herein are weight percents unless otherwise indicated. The following table sets out the analyses of products prepared above as indicated:

TABLE

Product Analysis

|  | Percent S | Percent N | Acidity [1] | $N_D$ 20° C. | Percent Yield |
|---|---|---|---|---|---|
| Theoretical analysis of 2,5-bis (t-octyldithio)-1,3,4-thiadiazole | 36.4 | 6.35 | 0 |  |  |
| Theoretical analysis of 2,5-bis (n-butyl-dithio)-1,3,4-thiadiazole | 49.0 | 8.6 | 0 |  |  |
| Preparation III | [2] 36.2 | [2] 5.96 | [2] 12 | [2] 1.578 | [3] 82 |
| Example I | [2] 35.6 | [2] 5.78 | [2] 2.2 | [2] 1.572 | [3] 85 |
| Example II | 35.5 | 5.71 |  | 1.573 | [3] 74.8 |
| Example III | [2] 37.0 | [2] 5.66 | [2] 12 | [2] 1.574 | [3] 85 |
| Example IV | 46.5 | 7.1 |  |  |  |
| Example V | 34.8 | 5.6 | 22 | 1.571 | [4] 89 |
| Example VI | 35.4 | 6.09 | 18.9 | 1.5749 | [4] 90 |

[1] Mg. KOH/g. sample.
[2] Computed from several runs.
[3] Based on hydrazine hydrate use for preparation of 2,5-dimercapto-1,3,4-thiadiazole sodium salt.
[4] Based on mercaptan added.

It is evident from the above that I have provided a process for the preparation of 2,5-bis(hydrocarbondithio)-1,3,4-thiadiazole in excellent yields which process does not require anhydrous operating conditions, the handling of chlorine, or the disposal of hydrogen chloride. Further, my process may utilize the reaction mixture as it results from the preparation of 2,5-dimercapto-1,3,4-thiadiazole or salts thereof without intervening purification steps.

I claim:

1. The process of preparing 2,5-bis(R-dithio)-1,3,4-thiadiazole which comprises reacting a compound selected from the group consisting of 2,5-dimercapto-1,3,4-thiadiazole and the alkali metal salts of 2,5-dimercapto-1,3,4-thiadiazole with R-mercaptan and hydrogen peroxide, wherein R is a hydrocarbon radical.

2. The process of preparing 2,5-bis(R-dithio)-1,3,4-thiadiazole which comprises reacting a compound selected from the group consisting of 2,5-dimercapto-1,3,4-thiadiazole and the alkali metal salts of 2,5-dimercapto-1,3,4-thiadiazole with from about 1.75 to about 2.25 moles of R-mercaptan per mole of said compound in the presence of from about 1.75 to about 3 moles of hydrogen peroxide per mole of said compound, wherein R is a hydrocarbon radical having from 1 to about 30 carbon atoms.

3. The process of claim 2 wherein said hydrocarbon radical is an aliphatic hydrocarbon radical.

4. The process of claim 2 wherein said compound is 2,5-dimercapto-1,3,4-thiadiazole.

5. The process of claim 2 wherein said compound is a sodium salt of 2,5-dimercapto-1,3,4-thiadiazole.

6. The process of claim 2 wherein the R group of the 2,5-bis(R-dithio)-1,3,4-thiadiazole is an alkyl group which contains at least about 4 carbon atoms and no more than about 16 carbon atoms and the R group of the mercaptan corresponds thereto.

7. The process of claim 2 wherein the 2,5-bis(R-dithio)-1,3,4-thiadiazole is 2,5-bis(t-octyldithio)-1,3,4-thiadiazole and the R-mercaptan is t-octyl mercaptan.

8. The process of claim 2 wherein the 2,5-bis(R-dithio)-1,3,4-thiadiazole is 2,5-bis(n-butyldithio)-1,3,4-thiadiazole and the R-mercaptan is n-butyl mercaptan.

9. A method for preparing 2,5-bis(hydrocarbondithio)-1,3,4-thiadiazole from a three phase reaction system including an organic phase containing hydrocarbon mercaptan, an aqueous phase including a reflux solvent and hydrogen peroxide as a promoter, and a solid phase including a 2,5-dimercapto-1,3,4-thiadiazole compound, which method comprises heating said reaction system to a temperature in the range of from about 0° C. to about 100° C. and separating 2,5-bis(hydrocarbondithio)-1,3,4-thiadiazole as the organic phase of the resulting products.

10. The process of preparing 2,5-bis(alkyldithio)-1,3,4-thiadiazole which comprises contacting a compound selected from the group consisting of 2,5-dimercapto-1,3,4-thiadiazole and an alkali metal salt of 2,5-dimercapto-1,3,4-thiadiazole with an alkyl mercaptan and hydrogen peroxide at a temperature in the range of from about 0° C. to about 100° C.

11. The process of preparing 2,5-bis(alkyldithio)-1,3,4-thiadiazole which comprises contacting a compound from the group consisting of 2,5-dimercapto-1,3,4-thiadiazole and an alkali metal salt of 2,5-dimercapto-1,3,4-thiadiazole with from about 1.9 to about 2.1 moles of an alkyl mercaptan and from about 1.9 to about 2.2 moles of hydrogen peroxide at a temperature in the range of from about 15° C. to about 85° C.

12. In a process for the preparation of 2,5-bis(alkyldithio)-1,3,4-thiadiazole by the reaction of 2,5-dimercapto-1,3,4-thiadiazole with an alkyl mercaptan, the improvement which comprises carrying out said reaction under hydrous conditions in the presence of hydrogen peroxide at a temperature in the range of from about 0° C. to about 100° C.

13. A process for the preparation of 2,5-bis(alkyldithio)-1,3,4-thiadiazole from an alkali metal salt of 2,5-dimercapto-1,3,4-thiadiazole which process comprises contacting from about 1.9 moles to about 2.3 moles of hydrogen peroxide and from about 1.9 to about 2.2 moles of inorganic acid per mole of said salt with a mixture of said alkali metal salt of 2,5-dimercapto-1,3,4-thiadiazole and from about 1.9 to about 2.1 moles of alkyl mercaptan per mole of said salt at a temperature in the range of from about 15° C. to about 85° C.

14. The process of preparing 2,5-bis(alkyldithio)-1,3,4-thiadiazole which comprises the steps of contacting a compound selected from the group consisting of 2,5-dimercapto-1,3,4-thiadiazole and the alkali metal salts of 2,5-dimercapto-1,3,4-thiadiazole with from about 1.9 to about 2.1 moles of an alkyl mercaptan per mole of said compound whereby an organic layer and an aqueous layer is formed, adding from about 1.9 moles to about 2.3 moles of hydrogen peroxide per mole of said compound to the resulting mixture at a temperature in the range of from about 0° C. to about 100° C., maintaining the temperature of the mixture in the range of from about 60° C. to about 100° C. for a period of from about 0.5 to about 2 hours, and separating the organic layer containing 2,5-bis(alkyldithio)-1,3,4-thiadiazole from the aqueous layer.

15. The process of claim 10 wherein said compound is the disodium salt of 2,5-dimercapto-1,3,4-thiadiazole and said compound is contacted with from about 1.9 to about 2.1 moles of sulfuric acid per mole of said compound.

References Cited in the file of this patent

UNITED STATES PATENTS 2,713,053   D'Amico _____ July 12, 1955
2,719,126   Fields et al. _____ Sept. 27, 1955

OTHER REFERENCES

Bambas: "Chem. of Heterocyclic Compounds" (Interscience), pages 180, 185 (1952).

UNITED STATES PATENT OFFICE

CERTIFICATE OF CORRECTION

Patent No. 3,087,932                      April 30, 1963

Randel Q. Little, Jr.

It is hereby certified that error appears in the above numbered patent requiring correction and that the said Letters Patent should read as corrected below.

Column 4, line 42, for "solubility" read -- insolubility --.

Signed and sealed this 19th day of November 1963.

(SEAL)
Attest:

ERNEST W. SWIDER
Attesting Officer

EDWIN L. REYNOLDS

Acting Commissioner of Patents